United States Patent [19]

Garrett et al.

[11] 4,287,163
[45] Sep. 1, 1981

[54] PROCESS FOR RECOVERING LITHIUM FROM BRINE BY SALTING OUT LITHIUM SULFATE MONOHYDRATE

[75] Inventors: Donald E. Garrett, Ojai, Calif.; Martin Laborde, New York, N.Y.

[73] Assignees: Saline Processors, Inc., Ojai, Calif.; Corporacion de Fomento de la Produccion, Santiago, Chile

[21] Appl. No.: 43,136

[22] Filed: May 29, 1979

[51] Int. Cl.³ .................. B01D 9/02; C01B 35/00; C01B 35/14; C01D 15/06
[52] U.S. Cl. .................. 423/283; 23/295 S; 23/298; 23/300; 23/302 R; 159/1 S; 423/179.5; 423/551
[58] Field of Search ............ 23/295 S, 298, 300, 23/302 R, 307, 304; 423/179 S, 181, 199, 202, 283, 499, 552, 551; 159/1 S

[56] References Cited

U.S. PATENT DOCUMENTS

| 1,321,282 | 11/1919 | Burnham | 423/551 |
| 1,886,868 | 11/1932 | Burnham | 23/295 S |
| 2,104,009 | 1/1938 | Burke et al. | 423/283 |
| 2,608,465 | 8/1952 | May | 423/179.5 |
| 3,342,548 | 9/1967 | Macey | 423/199 |
| 4,159,311 | 6/1979 | Lee et al. | 423/179.5 |

OTHER PUBLICATIONS

Kirk–Othmer, "Encyclopedia of Chem. Tech.", vol. 2, pp. 607–614 & vol. 8, pp. 469 & 476, 1952, vol. 12, p. 547, 1967.

*Primary Examiner*—Bradley Garris
*Attorney, Agent, or Firm*—Kenneth J. Hovet

[57] ABSTRACT

A salting-out process for recovering lithium from brines which have been concentrated by solar or thermal evaporation. Soluble sulfate salts are added to the strong brine solutions containing lithium to yield lithium sulfate monohydrate. Subsequent treatment of some residual brines with a strong acid will crystallize quantities of boron present as boric acid. Depending on the time of year and type of brine being used, a brine solar heating or plant evaporation system is provided to enhance the recovery processes.

17 Claims, 3 Drawing Figures

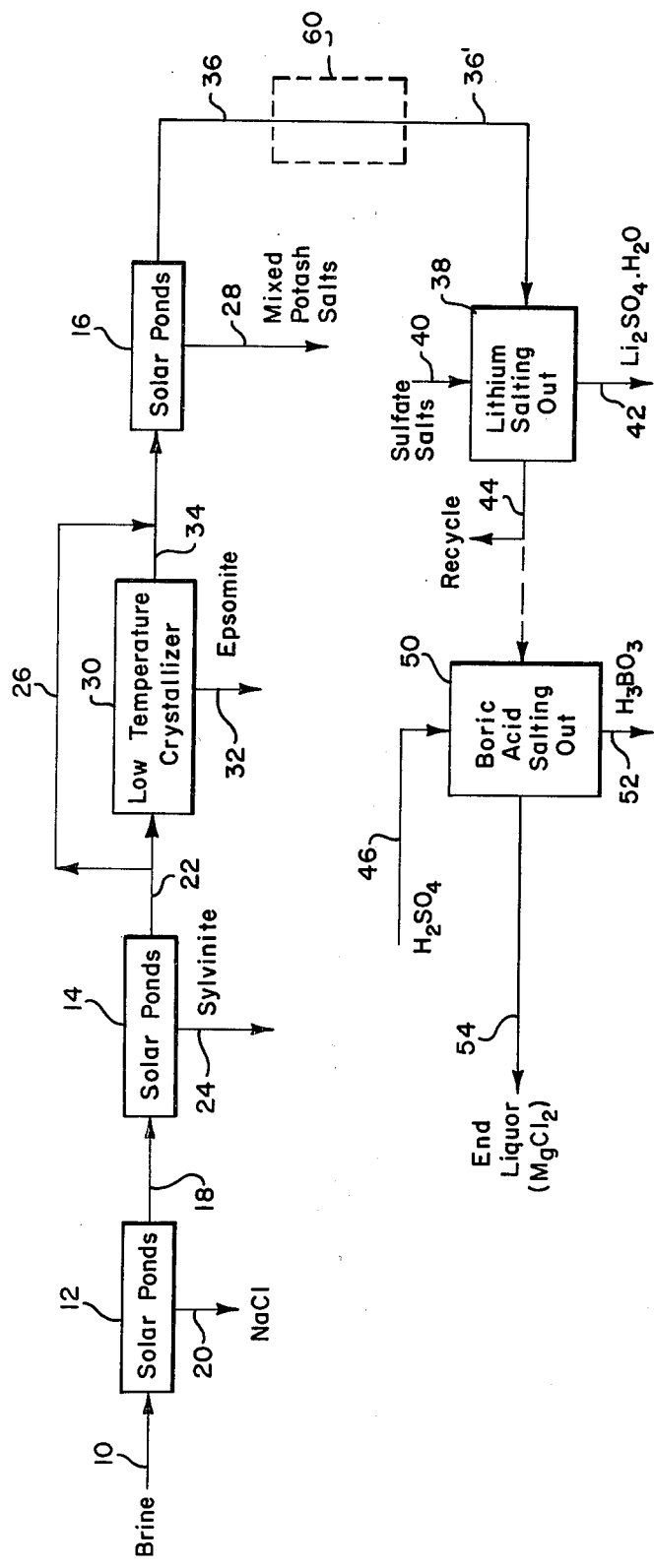
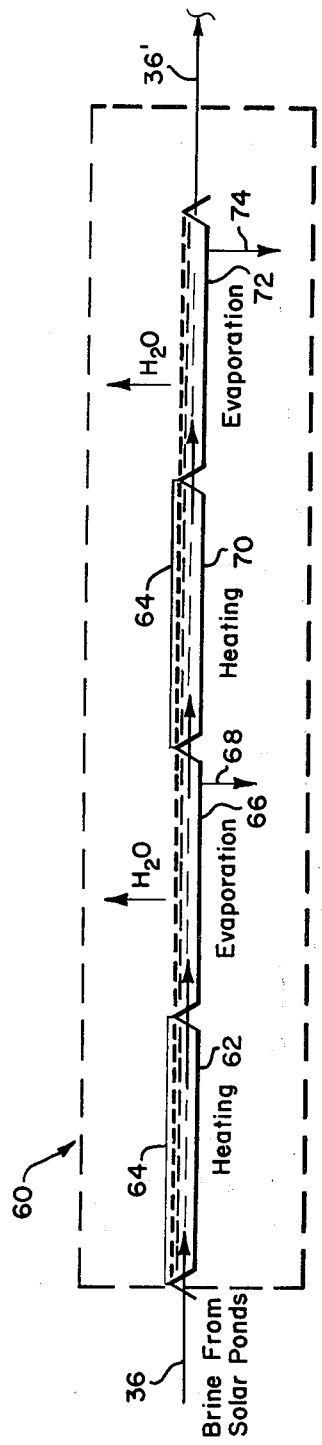
FIG. 1
FIG. 2

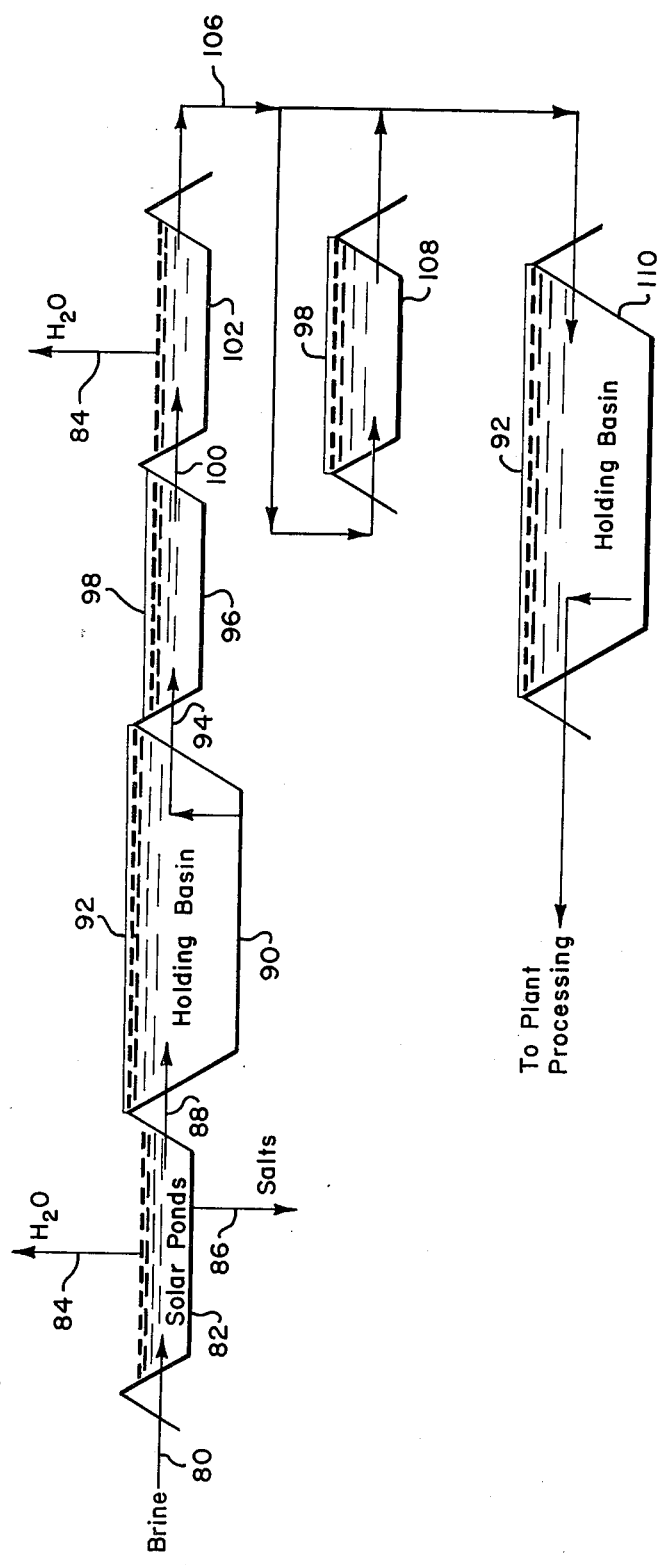

PROCESS FOR RECOVERING LITHIUM FROM BRINE BY SALTING OUT LITHIUM SULFATE MONOHYDRATE

BACKGROUND OF THE INVENTION

1. Field of the Invention

The present invention is concerned with the recovery of lithium and boric acid from lithium and boron-containing brines and, more particularly, with a brine sulfate salting-out process for lithium recovery which may be preceded or followed by a brine strong acid treatment to yield boric acid.

2. Description of the Prior Art

Generally, small but commercially significant quantities of lithium may be found in certain industrial effluents and in many of the salt lakes around the world. Typically, the small quantities of lithium are concentrated by various methods and then recovered by known precipitation or separation means.

Because of the economics in concentrating large quantities of brine, solar pond evaporation in combination with other treatments are commonly utilized in recovering the lithium values. U.S. Pat. No. 3,268,289 describes a system for precipitating sodium sulfate from Great Salt Lake brine and utilizing the sulfate to selectively remove magnesium salts therefrom. Further evaporation of the brine results in increased concentration of lithium chloride which facilitates its recovery.

A solar pond management system for recovering lithium values is disclosed in U.S. Pat. No. 3,342,548. This patent coordinates seasonal weather patterns with the flow of brine between solar ponds and the selective precipitation of magnesium, potassium and sodium salts. The purpose of the system is to increase the level of lithium chloride and diminish the level of magnesium chloride for easier recovery of the lithium salt.

In U.S. Pat. No. 3,537,813 a metal halide such as ferric chloride is added to lithium-containing brines along with an acid to form an insoluble lithium complex. The lithium is subsequently extracted with an organic solvent and phase separation treatment.

SUMMARY OF THE INVENTION

The system of the present invention provides an effective and uncomplicated means of recovering valuable lithium from concentrated lithium-containing brines. Soluble sulfate salts are used as salting-out agents to precipitate lithium sulfate monohydrate. Since brines of the Na-K-Mg-Li-SO$_4$-Cl system usually contain recoverable amounts of Mg and SO$_4$, a preliminary cooling crystallization thereof from the brine can provide a convenient source of magnesium sulfate, a preferred salting-out agent. To effect such crystallization, the brine should contain at least 20 moles MgCl$_2$/1000 moles H$_2$O, and preferably 35 to 65 moles. Other sulfate salts useful as salting-out agents are sodium sulfate and sulfuric acid, including any of their (including magnesium) hydrates or partially dehydrated salts.

The salting-out system of the present invention is generally economically feasible when the brine being treated has a lithium ion concentration of at least 0.4 weight percent. If the final brine has an equivalent boric acid content of greater than about 1.0 weight percent, subsequent treatment with a strong acid such as sulfuric acid to a pH between 0 and 4 will crystallize boric acid as a valuable by-product.

BRIEF DESCRIPTION OF THE DRAWINGS

FIG. 1 is a schematic flow chart illustrating the basic salting-out process of the present invention.

FIG. 2 is a schematic flow chart illustrating a modified treatment in which heating and evaporation are enhanced for brines having high magnesium chloride concentrations.

FIG. 3 is a schematic flow chart illustrating an alternative embodiment for heating and storing brines prior to the salting-out treatment.

DESCRIPTION OF PREFERRED EMBODIMENTS

With reference now to the basic process depicted in FIG. 1 of the drawings, bring 10 is shown entering solar pond 12. Each of the block diagrams depicting solar ponds 12, 14 and 16 can represent one or a plurality of open ponds which operate to heat incoming brines and evaporate water therefrom. Often water alone is removed from the initial ponds until the brine is concentrated sufficiently to begin precipitating sodium chloride shown by reference numeral 20.

Continued treatment of brine 18 in solar pond 14 will, with some brines, result in the precipitation of sylvinite 24. Brine 22 leaving solar pond 14 may then continue through line 26 to solar pond 16 where continued evaporation of the brine will result in the crystallization of mixed potash salts 28.

Alternately, some or all of brine 22 which has reached a concentration of at least about 20 moles MgCl$_2$/1000 moles water, enters a low temperature crystallizer 30. The crystallizer cools the brine below about 10° C. and epsomite (MgSO$_4$.7H$_2$O) is precipitated shown by reference numeral 32. In the preferred embodiment, the epsomite is transported to the lithium salting-out operation shown by reference numeral 38.

Residual brine 34 from the crystallizer flows to solar pond 16 or back to a section of pond 14 initially for additional sylvinite crystallization (not shown). The brine is treated in the same manner as with brine 26 (or 18).

After removal of the potash salts in solar ponds 16, the resultant brine concentration will be significantly higher, containing greater than about 30 moles MgCl$_2$/1000 moles H$_2$O. Treatment for removal of the aforementioned value salts is clearly advantageous in that the lithium present in the brine has been substantially concentrated and is now ready for transport through line 36,36' to salting-out operation 38. Alternately, the brine may be solar heated for further concentration, or evaporated in a plant as needed or desired in operation 60. Such additional treatment will be described hereinafter with reference to FIG. 2.

In the preferred embodiment magnesium sulfate 32 may be used as the salting-out agent 40. Such sulfate may be utilized in the form of "epsomite" directly from the crystallizer 30, or the epsomite may be washed and/or dehydrated prior to its addition to the concentrated brine 36.

Residual brine 44 leaving the salting-out operation may be cooled for MgSO$_4$ crystallization or recycled back to the initial epsomite crystallizer 30 for additional MgSO$_4$ production. If the residual brine contains sufficient boron concentration whereby it would be economically feasible to recover such, then the residual brine may be further treated with a strong acid 46 in a boric acid salting-out operation shown by reference numeral 50. In some cases (not shown) such treatment may precede the lithium recovery operation.

Generally, for such optional treatment the residual brine 44 should contain at least about 1.0 weight percent equivalent $H_3BO_3$. The boric acid 52 is recovered as crystals from the salting-out operation 50 and the end liquor 54 can be recycled in the same manner as the aforementioned residual brine stream 44.

The folliwing examples illustrate the various novel aspects of the present invention.

EXAMPLE 1

A. Analysis of Chilean Salar de Atacama "Q" Pond Brine

Density, =1.294 at 25° C.; pH=3.95 at 25° C.

| Ions | Comp., wt. % | | Moles per 1000 Moles $H_2O$ |
|---|---|---|---|
| Cl | = 21.63 | $MgCl_2$ | 66.46 |
| $SO_4$ | = 2.21 | $K_2Cl_2$ | 1.40 |
| Mg | = 5.91 | $Li_2Cl_2$ | 14.49 |
| K | = 0.41 | $Li_2SO_4$ | 6.18 |
| Li | = 1.007 | $Na_2B_{10}O_{16}$ | 1.18 |
| $B_{10}O_{16}$ | = 1.58 | | |
| B as $H_3BO_3$ | = 2.74 | | |

B. Ten grams sodium sulfate was added to 200 grams concentrated brine ("Q" pond; 1.077 wt % Li, 5.91% Mg) and the mixture agitated for 16 hours at room temperature. A 6.3% yield of solid phase lithium sulfate monohydrate was realized, but the product was contaminated with salt (NaCl) and excess $Na_2SO_4$.

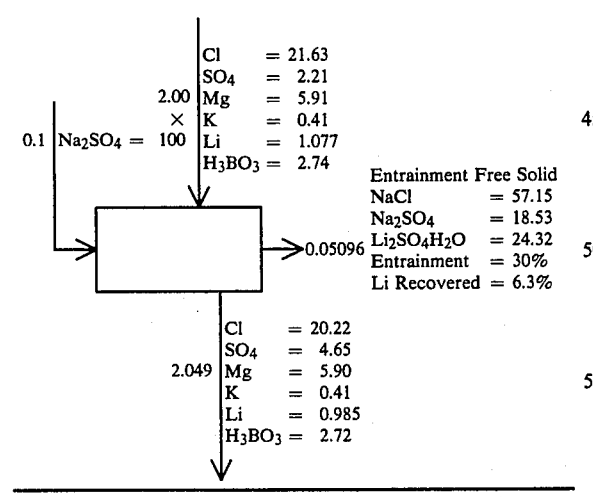

EXAMPLE 2

Experiment 1 was repeated, but with four times (20 g) as much sodium sulfate added to 100 g "Q" pond brine. A 14.3% lithium recovery was realized, but now it was also contaminated with $MgSO_4.6H_2O$ as well as salt and sodium sulfate.

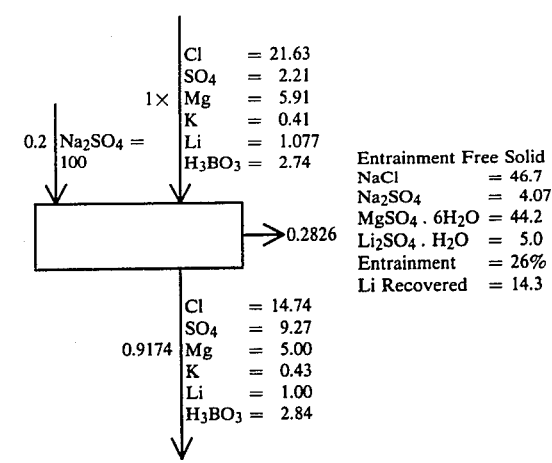

EXAMPLE 3

"Q" pond brine (112 g) was contacted with (10 g) solid phase $MgSO_4$ (containing 35.5% $H_2O$) and stirred for one hour. A 32% lithium recovery was realized, with only a 4.5% contamination with excess $MgSO_4.H_2O$.

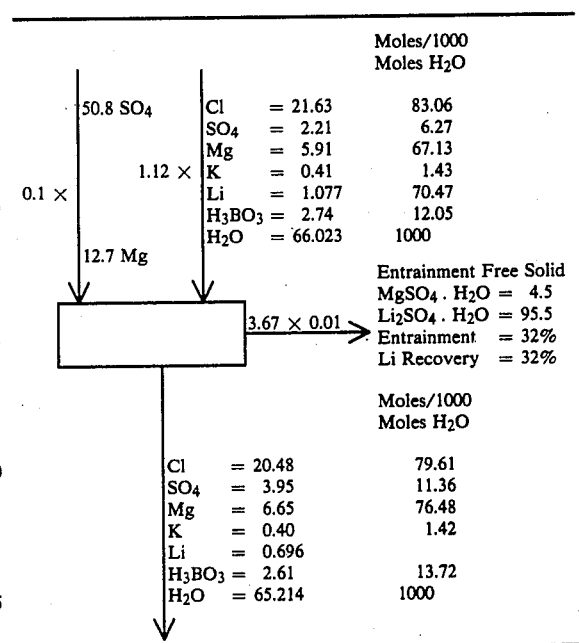

EXAMPLE 4

Experiment 3 was repeated with more concentrated "Q" pond brine (Mg=7.24 instead of 5.91 weight %). 108.4 g "Q" pond brine stirred for one hour with 10.0 g dried $MgSO_4$ (35.5% $H_2O$). A 49% lithium recovery was realized, again with only a 4% impurity of $MgSO_4.H_2O$.

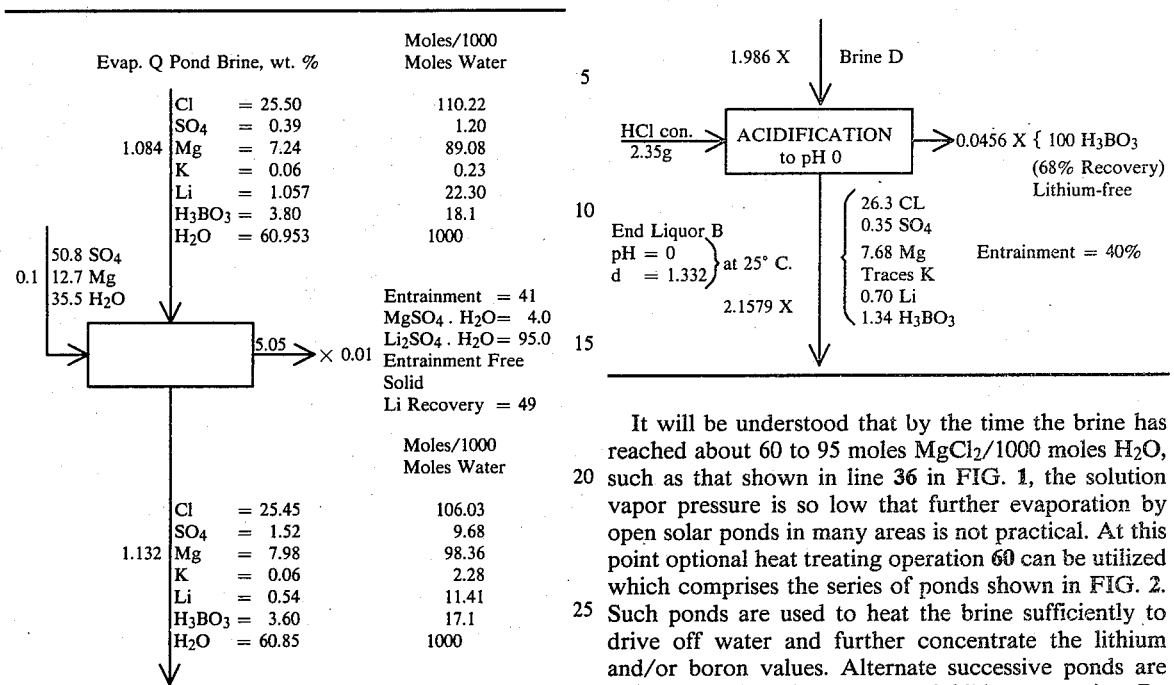

EXAMPLE 5

Concentrated sulfuric acid was added to a more dilute "Q" pond brine (Li=0.70 instead of 1.077 weight %). A 17.6% lithium and 68% boron recovery was realized.

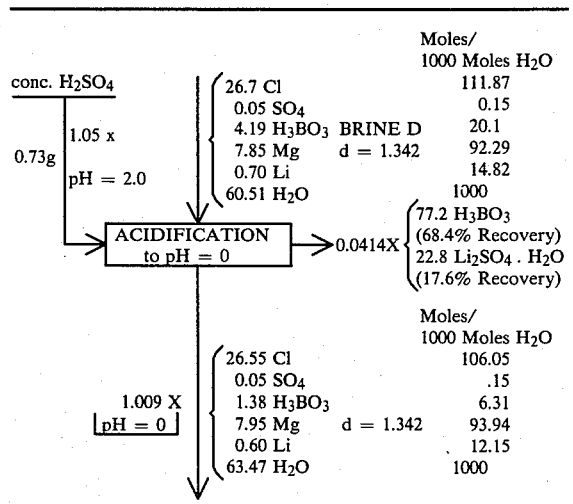

EXAMPLE 6

Experiment 5 was repeated with hydrochloric acid to check the effectiveness of the sulfate ion. The same boron recovery was obtained, but no lithium was crystallized.

It will be understood that by the time the brine has reached about 60 to 95 moles $MgCl_2/1000$ moles $H_2O$, such as that shown in line 36 in FIG. 1, the solution vapor pressure is so low that further evaporation by open solar ponds in many areas is not practical. At this point optional heat treating operation 60 can be utilized which comprises the series of ponds shown in FIG. 2. Such ponds are used to heat the brine sufficiently to drive off water and further concentrate the lithium and/or boron values. Alternate successive ponds are provided with surface means to inhibit evaporation. By alternately heating and then evaporating moisture in successive ponds, the brine can continue to become concentrated beyond its normal end point. Naturally, plant evaporators could also be used.

Referring now to the flow chart of FIG. 2, brine 36 enters heating pond 62 which is covered with a surface film 64 of plastic, oil, various types of surface active agents, or other means known in the art to inhibit moisture loss. Upon a suitable elevation in temperature, the heated brine is flowed to evaporation pond 66. Depending on the incoming concentration, brine temperature and ambient conditions, bischofite may be precipitated as shown by reference numeral 68.

Alternately, additional heating may be required whereby the brine is transported to heating pond 70 which is covered with the aforementioned surface means 64. After an appropriate elevation in temperature, the brine is again transported to evaporation pond 72. As further evaporation takes place, bischofite shown by reference numeral 74, will precipitate out of the brine. The highly concentrated brine 36' leaves the evaporation pond 72 for salting-out treatment at operation 38 as shown and discussed with reference to FIG. 1.

With certain brines at some locations having cool and/or rainy winter seasons, a modification of the initial solar pond brine treatment system may be desirable. A system for treating a weak brine during the aforementioned winter season is illustrated in FIG. 3.

Weak brine 80 enters a series of solar ponds wherein the brine is heated, water is evaporated and the normal salts are removed in the same manner as that shown in ponds 12, 14 and 16 of FIG. 1. The warm concentrated brine 88 is then transported to a deep holding basin 90. The basin is provided with an insulating cover means 92 which could comprise floating beads, plastic balls, slabs of foam plastic or other materials known in the art that are inexpensive and have insulative qualities. As a result of the insulative cover, warm brine entering the holding basin will be maintained in the warm state until needed for further processing.

Clearly, it is desirable to transport the brine from the solar ponds during the warm summer days or warm periods in a day so that the heat absorbed will be retained in the holding basin during the cooler night or colder winter months. At a later time, the stored brine may be transported at 94 to shallow ponds 96 having a surface covering 98 which will inhibit evaporation of water in the same manner as surface means 64 in FIG. 2. Such ponds 96 shall be shallow and thereby absorb considerable solar energy with no evaporative cooling effect taking place. The heated brine 100 will then be allowed to flow to evaporation pond 102 whereby water will be evaporated and the brine concentrated thereby.

The above-described sequence may be repeated until the brine concentration has reached the desired level. Subsequently, the concentrated brine will leave the evaporative ponds 102 and flow through line 106 to a holding basin 110 or to an optional final heating pond 108 having the aforementioned surface covering 98. In this manner the brine entering holding basin 110 will be at a suitable elevated temperature. The holding basin 110 is provided with an insulative cover 92 in the same manner as holding basin 90.

During cooler weather, the shallow holding ponds may be drained at the end of each day's operation so that the warmth absorbed during the daytime hours will be retained in the holding basin. A further advantage of the aforementioned procedure is that the holding basin 110 can supply concentrated brine to the lithium salting-out operation 38 whenever such is needed or convenient.

An example demonstrating cool weather treatment of brines containing small concentrations of lithium is as follows:

EXAMPLE 7

End liquor from a potash recovery operation at Bonneville, Utah reaches a concentration where no further evaporation can take place for about four months of the year, and the evaporation is slow for the remainder of the year. At that concentration the lithium content is about 0.5 wt. %. Such brine was sent to deep (9 ft.) holding ponds covered with a one-inch layer of floating polyurethane chips during the cooler six months of the year. When the weather was adequately warm (i.e., 70° F.) and sunny, it was pumped to shallow oil-covered ponds for heating to greater than 120° F., then to shallow evaporating ponds, and finally back to a deep holding pond for the evening. This procedure, along with normal oil-covered pond operation in the summer, allowed a 1.0% Li brine to be processed by salting out uniformly throughout the year. Bischofite was harvested from the ponds periodically, and carefully dewatered and washed. The wash brine was returned to the ponds for subsequent recovery of entrained lithium values.

It should be noted that with some brines there may be a shortage of $MgSO_4$ available in the brine (or none present at all), and in other cases the lithium concentration may be high enough so that it would tend to crystallize in the solar ponds before the desired salting-out concentration was reached, or before the normal end point of evaporation. For such cases, crystallization at low temperature of the salted-out end liquor will recover much of the excess $MgSO_4$, and allow evaporation to proceed without crystallizing $Li_2SO_4.H_2O$. With high-lithium brines, this sequence may be repeated several times in the total brine processing operation.

As mentioned previously, plant evaporation may be used to supplement or replace the solar evaporation ponds whenever economics allow. This may occur where brine concentration is high or during cold weather. Also, with some brines sulfuric acid can be used initially to salt-out either boric acid alone or as a mixture with lithium sulfate monohydrate. In the latter case, either a cold-water or hot-water leach can be used to separate the lithium sulfate monohydrate from the boric acid.

It will be appreciated that the recovery systems of the present invention are inexpensive and simple to operate, and thereby have a distinct advantage over the complex expensive lithium recovery processes described in the prior art. The present invention can utilize sulfate salts contained within the brine itself without the necessity of purchasing expensive ingredients from outside sources and can be operated to recover any significant amounts of boron that are present. Also, the systems have significant versatility in that they can be operated under various types of weather conditions.

Although the invention has been described with respect to preferred embodiments, it should be clear to those skilled in the art that other modifications may be made without departing from the spirit and scope of the invention. As such, it will be understood that the invention is not to be limited by the specific illustrative embodiments but only by the scope of the appended claims.

What is claimed is:

1. A process for recovering lithium values from sulfate-containing brines having a lithium ion concentration of at least 0.4 weight percent and at least about 30 moles $MgCl_2$ per 1000 moles $H_2O$ comprising adding to said brines a soluble sulfate salt and recovering therefrom lithium sulfate monohydrate.

2. The process of claim 1 wherein said soluble sulfate salt is selected from the group consisting of magnesium sulfate, sodium sulfate, sulfuric acid and any respective hydrates or partially dehydrated salts of said group.

3. The process of claim 1 including the step of removing epsomite from said brine prior to the addition of said soluble sulfate salt.

4. The process of claim 3 wherein the brine just prior to removing epsomite contains at least about 20 moles $MgCl_2/1000$ moles $H_2O$.

5. The process of claim 1 wherein said epsomite is used as the soluble sulfate salt.

6. The process of claim 1 wherein said brine has been subjected to solar pond evaporation prior to the addition of said soluble sulfate salt for removal of any one or more value salts selected from the group consisting of sodium chloride, sylvinite and mixed potash salts.

7. The process of claim 6 wherein subsequent to removal of said value salts and prior to the addition of said soluble sulfate salt, the brine is solar heated by flow through successive ponds which are alternately provided with a surface covering.

8. The process of claim 7 wherein brine entering said successive ponds contains about 60 to 95 moles $MgCl_2/1000$ moles $H_2O$.

9. The process of claim 8 wherein bischofite is recovered as a result of brine evaporation from solar heating in said successive ponds.

10. The process of claim 7 including the transport of heated brine from any one of said successive ponds to at least one holding basin having insulating cover means whereby said brine can be stored for subsequent processing.

11. The process of claim 10 wherein transport of said heated brine to said basin is regulated to occur prior to significant cooling resulting from ambient weather conditions.

12. The process of claim 1 wherein said brine contains at least about one weight percent equivalent boric acid, including the step of salting-out boric acid with a strong acid.

13. The process of claim 12 wherein the step of salting-out boric acid occurs subsequent to removal of value salts from said brine.

14. The process of claim 13 wherein salting-out boric acid is carried out to a pH between 0 and 4.

15. The process of claim 13 wherein the step of salting-out boric acid occurs subsequent to the addition of said soluble sulfate salt.

16. The process of claim 12 wherein said strong acid comprises sulfuric acid.

17. The process of claim 16 wherein said sulfuric acid is added to the brine until a pH of less than about 3.0 is achieved.

* * * * *